Figures 1, 2, 3:
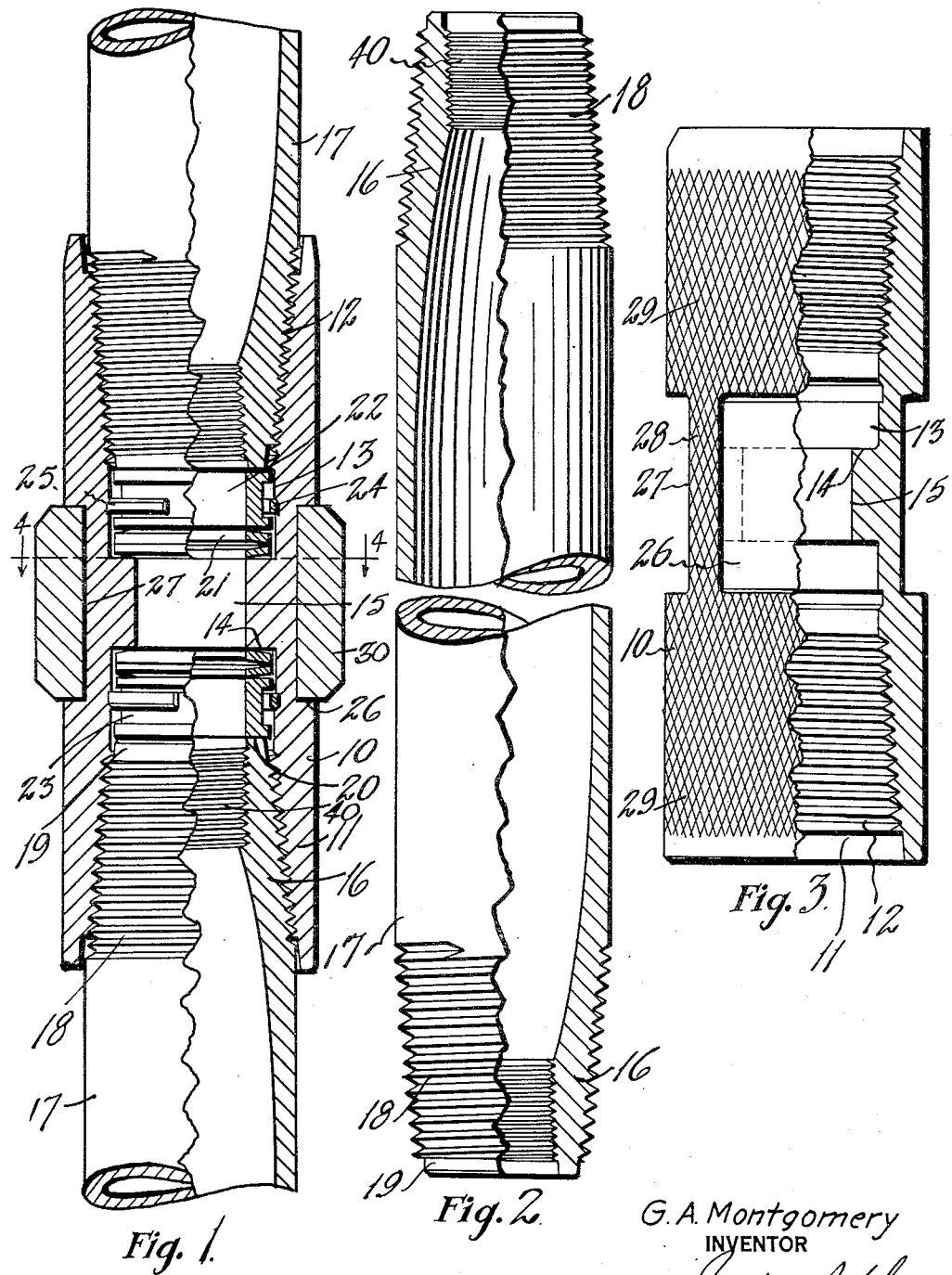

Dec. 6, 1932.   G. A. MONTGOMERY   1,889,867
TUBULAR COUPLING
Filed June 24, 1929   4 Sheets-Sheet 1

G. A. Montgomery
INVENTOR
BY Jack A. Schley
ATTORNEY

Dec. 6, 1932.    G. A. MONTGOMERY    1,889,867
TUBULAR COUPLING
Filed June 24, 1929    4 Sheets-Sheet 2
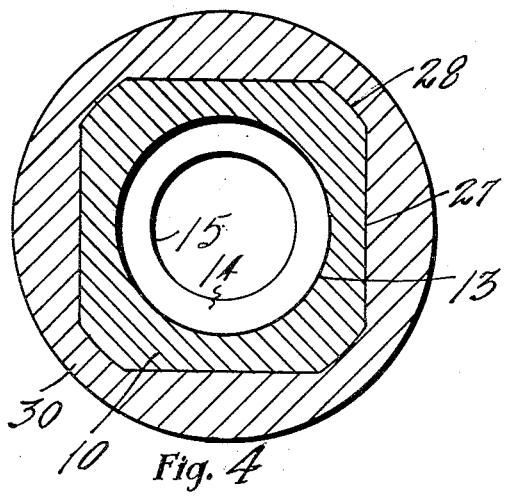
Fig. 4.
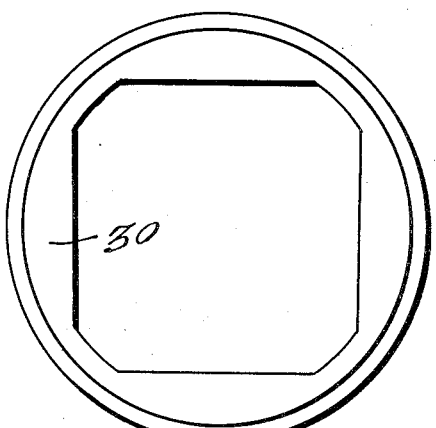
Fig. 5.
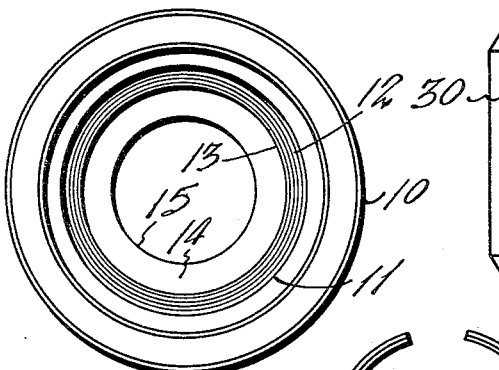
Fig. 7.
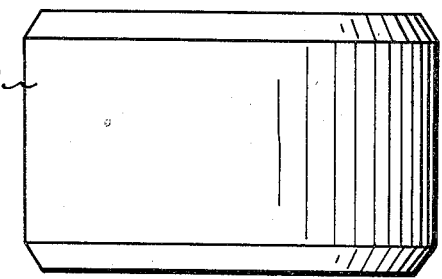
Fig. 6.
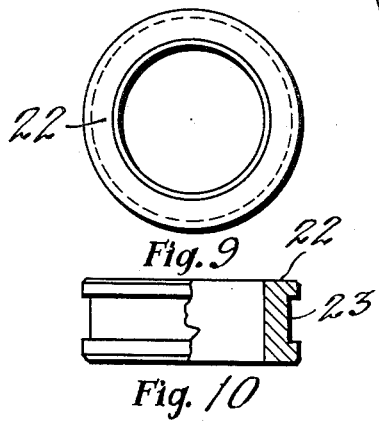
Fig. 9.
Fig. 10.
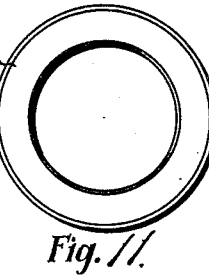
Fig. 12.
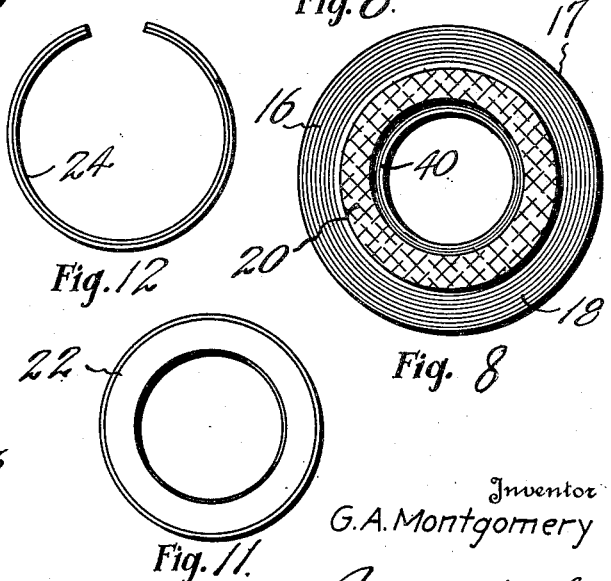
Fig. 8.
Fig. 11.
Inventor
G. A. Montgomery
By Jack A. Ashley
Attorney

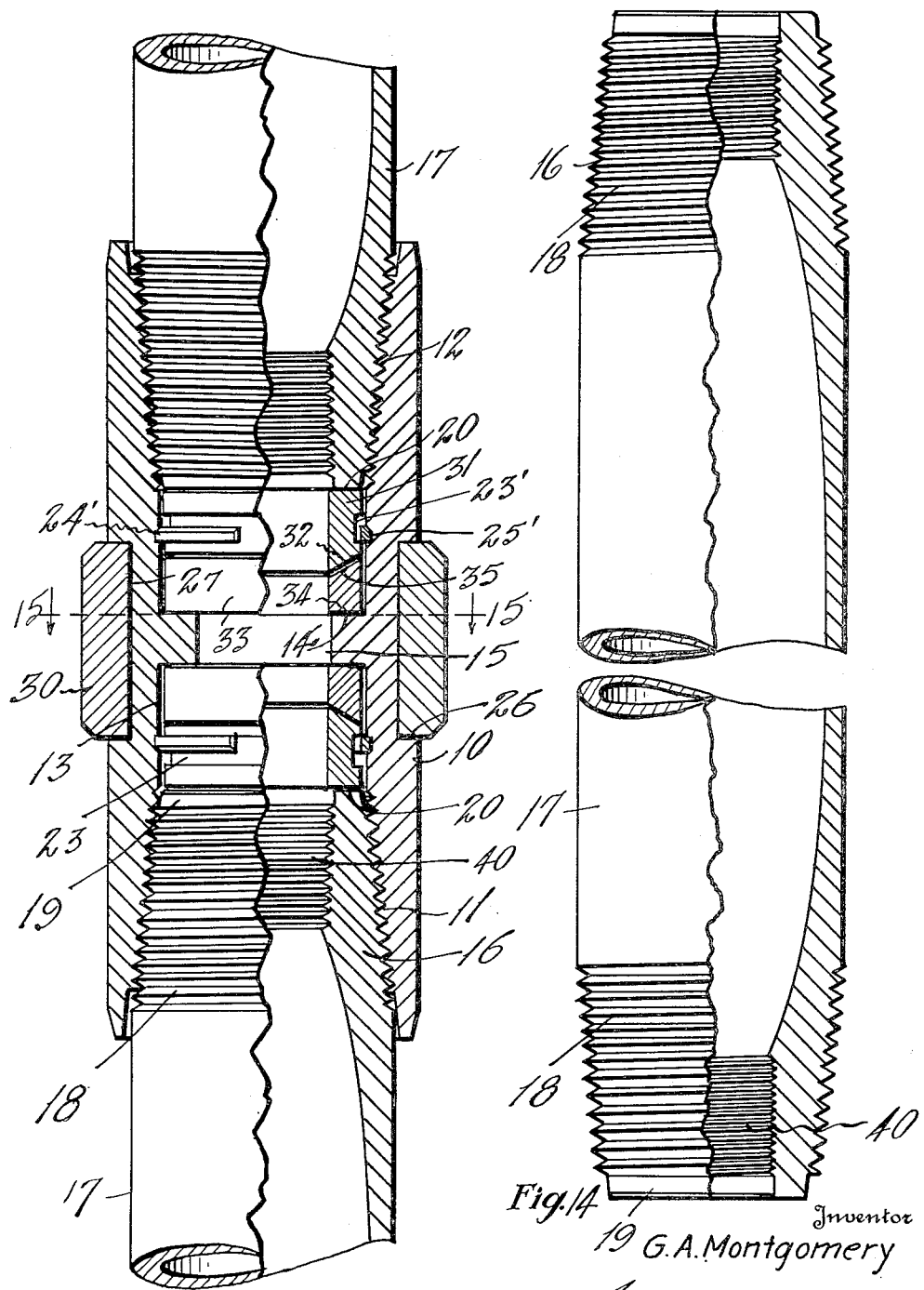

Dec. 6, 1932.  G. A. MONTGOMERY  1,889,867
TUBULAR COUPLING
Filed June 24, 1929  4 Sheets-Sheet 4

Inventor
G. A. Montgomery
By
Attorney

Patented Dec. 6, 1932

1,889,867

UNITED STATES PATENT OFFICE

GUSTAVUS A. MONTGOMERY, OF DALLAS, TEXAS

TUBULAR COUPLING

Application filed June 24, 1929. Serial No. 373,356.

This invention relates to new and useful improvements in tubular couplings.

It often happens during drilling that the boring tool becomes caught in crevices or other obstructions in the bottom of the well. The rotary machine keeps on turning the drill pipe, on the surface of the derrick floor, with the result that the pipe becomes highly stressed by torque. If so stressed beyond the elastic limit of the tube material, it will take a permanent set or twist off altogether. However, much oftener the temporary obstruction encountered by the drilling tool is suddenly overcome and the great torque stress is released immediately, causing the lower or free end of the pipe to rotate faster than the point of torque application, resulting in unscrewing the tube at some threaded connection.

One object of the invention is to lessen or entirely eliminate the contingency set forth by providing a cushioned device inherent with this coupling arranged so as to take the reverse torque or thrust between the end of the pin and the socket in the box of the coupling sleeve without destroying the effective liquid seal.

A further object of the invention is to provide a thrust ring loosely confined in the socket of the box and interposed between suitable cushioning means and the end of the pin, whereby said ring is free to rotate but cannot be dislodged from the box. By this arrangement when the joint was unscrewed due to the back-lash, the cushioning means would expand, thus help maintain the stop ring in heavy frictional contact with the end of the pin instead of releasing immediately when the unscrewing began, whereby unintentional unscrewing or breaking of the joint would be prevented.

Another object of the invention is to provide a non-metallic flexible collar surrounding the coupling sleeve and projecting therefrom to act as a guide and a protector, together with means for preventing circumferential movement or creeping of said collar.

Still another object of the invention is to provide pipes or tubes having upset ends formed into tapered break out pins, which are exteriorly screw-threaded for coupling purposes and also may be interiorly threaded for receiving a fishing plug, as will be hereinafter explained.

A still further object of the invention is to provide a coupling for drill stems formed of one piece with two break out joints instead of two pieces with one break out joint as is conventional, and also wherein the liquid sealing shoulders are protected by being positioned interiorly instead of exteriorly.

A construction designed to carry out the invention will be hereinafter described together with other features of the invention.

Figure 15:
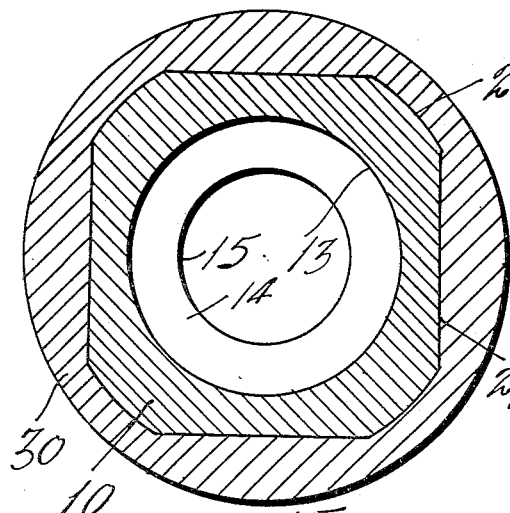
Figure 16:
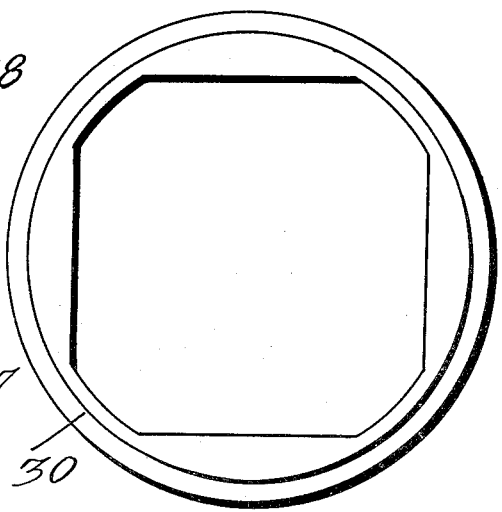
Figure 18:
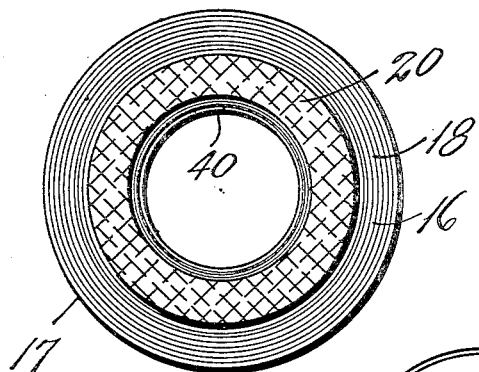
Figure 17:
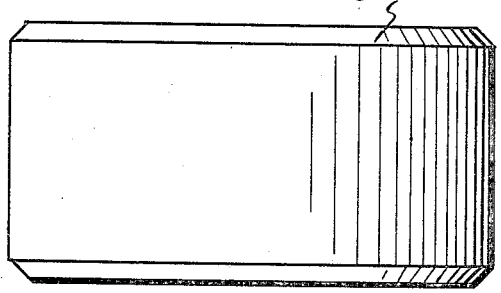
Figure 21:
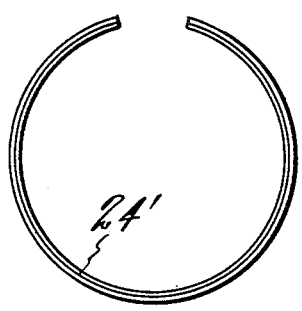
Figure 19:
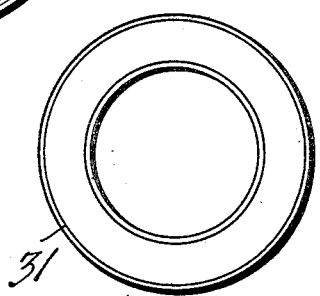
Figure 20:
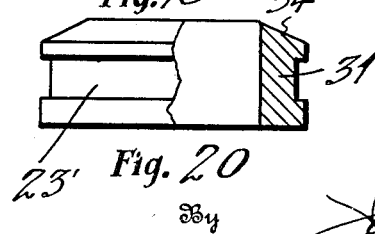
Figure 22:
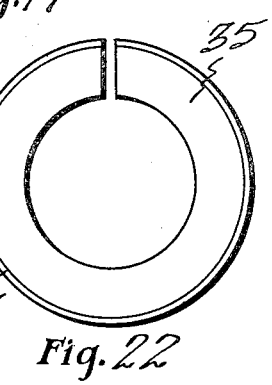

The invention will be more readily understood from a reading of the following specification and by reference to the accompanying drawings in which an example of the invention is shown, and wherein:

Figure 1 is a view partly in section and partly in elevation, showing a coupling constructed in accordance with the invention, Figure 2 is a broken view partly in section and partly in elevation, showing a section of pipe or tubing constructed in accordance with the invention, Figure 3 is a view partly in section and partly in elevation of a coupling sleeve for receiving the pipe or tube, Figure 4 is a horizontal cross-sectional view taken on the line 4—4 of Figure 1, Figure 5 is a plan view of the protector collar, Figure 6 is an elevation of the same, Figure 7 is an end view of the coupling sleeve, Figure 8 is an end view of the tubing or pipe, Figure 9 is a plan view of the stop ring, Figure 10 is a view of the same partly in section and partly in elevation, Figure 11 is a reverse plan view of the stop ring, Figure 12 is a plan view of the retaining ring, Figure 13 is a view similar to Figure 1 showing another form of the invention, Figure 14 is a broken view of one of the pipe or tube sections, partly in elevation and partly in section, Figure 15 is a horizontal cross-sectional view on the line 15—15 of Figure 13, Figure 16 is a plan view of the protector collar, used with the form shown in Figure 13, Figure 17 is an elevation of said collar, Figure 18 is a plan view of the section shown in Figure 14, Figure 19 is a plan view of the stop ring, Figure 20 is a view of the same partly in elevation and partly in section, Figure 21 is a plan view of the retaining ring, and Figure 22 is a plan view of the tension washer.

In the drawings the numeral 10 designates an elongated coupling member or sleeve having tapered boxes 11 at each end provided with internal screw threads 12. At the inner end or bottom of each box I provide a cylindrical socket or recess 13 having a shoulder 14. These sockets are connected by an axial bore 15 extending through the central portion of the sleeve which forms in effect an internal flange with opposite shoulders or faces 14.

Into the box 11 at each end of the sleeve 10 is screwed a pin 16. Each pin 16 is formed on an upset inwardly enlarged end of the usual pipe or tube 17. Coarse threads 18 are provided on each pin and the pin is acutely tapered so that the corresponding box threads 18 will engage the threads 12. It will be noted that the pipes 17 do not have shoulders and the screwing of the pin into the box is not limited by shoulders on either the pin or the box.

Each pin has a reduced nipple 19 on its end which is free from threads and is provided with a flat transverse face 20 lying in a plane at right angles to the longitudinal axis of said pin. This face which forms the end of the pin is preferably tempered to the required degree of hardness and is polished so as to form a thrust surface.

In each socket 13 is mounted a pair of dished spring washers 21. These washers are less in diameter than the socket and are placed with their concaved sides together so as to provide a cushion capable of being compressed. The washers rest upon the shoulders 14 of the internal flange and in each instance support a stop ring 22, which is freely rotatable in the socket and is provided with a circumferential groove 23. Each stop ring is confined in the socket by a retaining ring 24 sprung into a circumferential groove 25 in the wall of the socket. The groove 23 is sufficiently ample to permit movement of the stop ring longitudinally of the sleeve 10, thus permitting the washers 21 to be compressed and to expand against the internal flange face.

Each pin 16 is screwed into one of the boxes 11, the threads 18 engaging in the threads 12, but before the pin is tightened in the box there is a full thread engagement and as the face 20 of the nipple 19 engages the flat end of the ring 22 as the screwing by tonging progresses the washers 21 will be compressed against the shoulder 14, which at the same time acts as a gage which will compress the pin and expand the box below the elastic limit of the metal. By the time the pin is tightened in the box the washers will be flattened out and a tight joint will thus be provided which is liquid tight under back lash.

It is pointed out that the face 20 of the nipple 19, which is hardened, will contact and lock against the end of the ring 21 due to cooperative engagement with the combined stop flange and gage before sufficient force has been exerted by the screwing of the pin 16 into the box to expand said box beyond the elastic limit of its metal. The ring 21 may be made of steel and tempered very hard so that the face of the nipple will not adhere or roll into said ring. The ring being made separate may of course be separately tempered. It is obvious that the nipple may be made harder than the threads of the pin.

The effect of the spring washers between the ring 22 and the shoulder 14 of the internal flange is to cushion the contact between the face 20 of the pin and the stop or thrust ring 22. When the washers are flattened out the joint is constantly under tension, first due to the lateral tensioning of the pin and box below the elastic limit of the metal, and second due to the compression of the washers. If back-lashing occurs the initial frictional turn is taken up by the elastic tension of the pin and box and then upon commencing to unscrew the threaded joint, the compressed spring washers would immediately begin to expand, doing so at the rate of the unscrewing movement to prevent breaking the liquid seal.

In disconnecting the coupling the upper pipe 17 may be disconnected from the sleeve 10, thus leaving the latter fast on the lower pipe 19. After a period of usage the lower piper may be interchanged with the upper pipe and the sleeve reversed, thus changing the wear from one pin to the other and from one box to the other. By this reversible arrangement the life of the coupling is greatly prolonged. It has heretofore been necessary to manufacture the two-piece tool joint in specialty shops while the pipes have been produced by pipe mills. My improved coupling may be produced in its entirety by pipe mills, thus making for economy and convenience in manufacture.

The central area of the sleeve 10 is provided with circumferentially recessed contour 26 having flat bottoms or faces 27, as is shown in Figures 1, 3 and 4. The recesses are separated by narrow vertical panels 28 flush with the surface of the sleeve and connecting the upper and lower portions 29, whose surfaces like the surfaces of the panels, are roughened or knurled to afford ready gripping of the sleeve.

A flexible non-metallic protector collar 30, formed of rubber or other suitable material, is shaped to fit in the recesses 26 and engage on the panels 28. The flexible collar extending beyond the surface of the coupling member will protect the latter and will also act as a guide in passing through a casing or other pipe, thereby reducing wear and also tending to lessen the power required to rotate a drill stem. The flat bottoms 27 of the recesses will prevent creeping or circumferential movement of the collar.

In Figures 13 to 22, inclusive, I have shown another form of the invention in which all parts are substantially the same except the stop ring and tensioning washers. In this form a stop or thrust ring 31 is employed and it is substantially the same as the ring 22 except that one end is provided with a bevel 32. The ring 31 has a contact face for receiving the face 20 of the nipple 19 and is provided with a groove 23' for receiving a retaining ring 24' seated in a groove 25' like the ring 24.

In place of the spring washers 21 I provide a thickened washer 33 which is split and made of spring metal, such as steel, so as to be properly hardened and tempered. The ring has a flat end 34 which engages the shoulder 14 while its opposite end 35 is bevelled to conform to the bevel 32. It will be seen that when the pin 16 is screwed into the box 11 the face 20 will engage the stop ring 31 and cause a contact between the bevels 32 and 35, whereby the former will have a tendency to telescope into the latter, thus spreading the washer 33 in its socket and frictionally locking the parts under tension, similar to the washers 21. The washer is of such diameter as to engage the side wall of the socket 13 when spread, thus becoming non-elastic and forming a friction tight joint.

In each form the pin 16 is provided with an internal tapered and threaded portion 40 at its end. This threaded portion may be engaged by a fishing tool. Also by screwing a fishing plug (not shown) into said threaded portion, a fluid-tight joint is provided and circulation of the mud-fluid may be re-established while fishing.

In the form of coupling illustrated and described I have provided a one piece coupling with two break out joints due to the modification of the usual tube ends to act as break out pins. Furthermore each break out joint is provided with means for taking up back lash without breaking the seal and the seal is interiorly positioned which affords the greatest protection under working conditions. The cooperative sealing relationship between the inwardly enlarged upset pin end face and a correspondingly sized shoulder 14 of the internal flange, either with or without the ring and washer, makes this internal liquid seal effective and eliminates the necessity of external shoulders. The inwardly enlarged pin end carries the approximate tube wall width down behind the threads 12, so as to give a sufficient area to produce this result.

Various changes in the size and shape of the different parts, as well as modifications and alterations, may be made within the scope of the appended claims.

What I claim, is:

1. In a tubular coupling, tubular members free from external stop shoulders and having threaded pins at their ends, a coupling sleeve having internally threaded boxes receiving said pins, means within the sleeve abutted by the ends of the pins for forming liquid-tight joints between the pins and sleeve and for limiting the insertion of the pins in the boxes as well as for taking the end thrust of the members, and resilient means in the boxes for sustaining said last named means and tensioned by the pressure thereon from said pins.

2. In a tubular coupling, tubular members having threaded pins at their ends, a coupling sleeve having internally threaded boxes at each end for receiving said pins, rigid stop means seated rotatable in the coupling sleeve and receiving the ends of said pins, and resilient rings sustaining said stop means and tensioned by the pins when seated in the sleeve.

3. In a tubular coupling, tubular members having threaded pins at their ends, a coupling sleeve having internally threaded boxes at each end for receiving said pins, each pin having a flat faced nipple on its end, rigid stop rings seated in the sleeve and having flat faced ends for receiving the flat faces of the nipples and locking the members together but allowing unscrewing thereof, and resilient means for retaining the rings in the sleeve.

4. In a tubular coupling, tubular members having threaded pins at their ends, a coupling sleeve having internally threaded boxes receiving said pins, resiliently sustained means in the boxes frictionally engaged by the ends of the pins and tensioned thereby when the pins are tightened in the boxes, whereby unintentional unscrewing of the coupling is frictionally checked but not prevented by the expansion of the resilient means.

5. As an element in a tubular coupling, a pipe having its end upset and tapered without external stop shoulders to form a pin provided with internal and external screw threads and a flat unthreaded driving end of smallest external diameter finished in a plane at a right angle to the longitudinal axis of the pin and adapted to make a frictional seal at its ends in said coupling.

6. In a tubular coupling having a cross-sectionally round sleeve member, flat faces on its outer periphery intermediate its ends providing a recessed contour, and a non-metallic flexible protector collar seated in said contour, its engagement with said flat faces preventing rotational movement of the collar upon the sleeve.

7. In a tubular coupling having a sleeve, circumferentially spaced angular outer faces separated by longitudinal panels, and a non-metallic flexible protector collar surrounding the sleeve and seated on said faces.

8. In a tubular coupling, tubular members having tapered threaded pins at their ends, a coupling sleeve having internally threaded boxes at each end for receiving said pins, each pin having a flat faced nipple on its end, and stop rings seated in the sleeve and having flat faced ends for receiving the flat faces of the nipples and locking the members together.

9. A tubular coupling having threaded boxes at each end to receive the ends of pipe sections, an internal stop flange in said coupling, and resilient friction means on each side of said flange to engage and limit the screwing movement of said pipe ends in said couplings, said friction means being rotatable in said coupling in either direction.

10. A tubular coupling having threaded boxes at each end to receive the ends of pipe sections, an internal stop flange in said coupling, means at each side of said stop flange to frictionally engage and resist relative rotation of said pipe ends and to make a fluid seal therewith.

11. In a drill stem assembly, a coupling comprising a sleeve having opposite outwardly acutely tapered coarsely threaded boxes, an internal stop and gage flange between said boxes extending inwardly past the innermost threads, the adjacent faces of said flange being squared with respect to the axis of the box thread taper, and tube sections with inwardly acutely tapered coarsely threaded pin ends, the end of the pin being thickened to form enlarged faces, said end faces being squared with respect to the axis of the pin thread taper and adapted for cooperative engagement with the adjacent flange face when assembled to form an internal liquid seal with back lash take up.

12. A coupling for rotary drill stems including an inwardly acutely tapered pin with coarse external screw threads, the end of the pin being thickened to form an enlarged end face squared with respect to the axis of the pin thread taper, an acutely tapered box with coarse screw threads to receive the pin, a stop and gage shoulder in the box extending inwardly past the innermost thread and of an area substantially equal to the pin face, said shoulder being squared with respect to the axis of the thread taper of the box and adapted for cooperative engagement with the pin face to form an internal liquid seal and back lash take up.

13. In a rotary drill stem coupling, an acutely tapered box member, an acutely tapered pin member, said members being threaded for engagement to an extent wherein the box is under tension and the pin under compression, cooperatively engaging means on said members and engageable to form a liquid seal only as and while the members are under elastic stress, and certain of said cooperatively engaging means providing a stop gage with respect to the coupling to prevent advancing movement of the members to an increase of stress up to their elastic limits.

In testimony whereof I affix my signature.

GUSTAVUS A. MONTGOMERY.